(12) United States Patent
O'Hara et al.

(10) Patent No.: US 11,019,074 B2
(45) Date of Patent: May 25, 2021

(54) EVOLVING RULE BASED CONTACT EXCHANGE

(71) Applicant: Microsoft Technology Licensing, LLC, Redmond, WA (US)

(72) Inventors: Kenton Paul Anthony O'Hara, Bristol (GB); Michael Anthony Massimi, Cambridge (GB); Matthew Kay, Waterloo (CA); Richard Harper, Cambridge (GB); James William Scott, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 16/143,302

(22) Filed: Sep. 26, 2018

(65) Prior Publication Data

US 2019/0028486 A1 Jan. 24, 2019

Related U.S. Application Data

(60) Division of application No. 15/241,927, filed on Aug. 19, 2016, now Pat. No. 10,110,612, which is a
(Continued)

(51) Int. Cl.
*H04L 29/06* (2006.01)
*H04M 3/38* (2006.01)
(Continued)

(52) U.S. Cl.
CPC ............ *H04L 63/108* (2013.01); *H04L 51/12* (2013.01); *H04L 63/0428* (2013.01);
(Continued)

(58) Field of Classification Search
CPC ..... H04L 63/101; H04L 51/28; H04L 67/306; H04L 63/0428; H04L 63/108; H04L 51/12; H04L 61/1594; H04L 51/32; H04L 67/26; H04L 51/02; H04L 51/16; H04L 9/32; H04M 3/382; H04W 12/02; H04W 12/08;
(Continued)

(56) References Cited

U.S. PATENT DOCUMENTS

7,676,830 B2 * 3/2010 Kuz ................... H04L 63/10
726/5
8,280,954 B2 * 10/2012 Curry ..................... H04L 67/26
709/203
(Continued)

*Primary Examiner* — Thanhnga B Truong
(74) *Attorney, Agent, or Firm* — Schwegman Lundberg & Woessner, P.A.

(57) ABSTRACT

Methods and systems are described for managing a user's contact data which use evolving sequential sets of rules where the applicability of each set depends upon adherence or proper application of a prior set. In an embodiment, an initial set of restrictions are generated based on input from a first user, the restrictions relating to contact made by a second user to the first user. These initial restrictions are subsequently modified in response to the second user contacting the first user based on the contact made and a characteristic of the contact. The methods may apply to any form of contact between the first and second users and in an embodiment applies to contact made by the second user to a cellular telephone number belonging to the first user.

20 Claims, 5 Drawing Sheets

Related U.S. Application Data continuation of application No. 14/244,850, filed on Apr. 3, 2014, now Pat. No. 9,438,602.

(51) Int. Cl.
*H04L 12/58* (2006.01)
*H04W 12/02* (2009.01)
*H04W 12/08* (2021.01)
*H04L 29/12* (2006.01)

(52) U.S. Cl.
CPC .......... *H04L 63/101* (2013.01); *H04M 3/382* (2013.01); *H04W 12/02* (2013.01); *H04W 12/08* (2013.01); *H04L 51/32* (2013.01); *H04L 61/1594* (2013.01)

(58) Field of Classification Search
CPC ......... H04W 4/16; H04W 4/12; H04W 88/06; H04W 36/00; G06F 17/30345; G06F 17/30; G06F 9/5005; G06F 15/16; G06F 7/04; G06F 21/62; G06F 21/44; G06F 9/50; G06F 21/31; G06F 21/60; G06F 21/604; G06F 21/6218; G06F 16/00; G06Q 50/01; G06Q 10/107; G06Q 20/401; G06Q 10/02; G06Q 20/405
See application file for complete search history.

(56) References Cited

U.S. PATENT DOCUMENTS

| | | | |
|---|---|---|---|
| 9,374,744 B2* | 6/2016 | Hwang | H04W 36/0066 |
| 9,762,390 B2* | 9/2017 | McEwen | G06Q 20/401 |
| 2008/0033955 A1* | 2/2008 | Fujii | G06F 21/6218 |
| 2008/0189367 A1* | 8/2008 | Okumura | H04L 51/02 |
| | | | 709/204 |

* cited by examiner

EVOLVING RULE BASED CONTACT EXCHANGE

CROSS-REFERENCE TO RELATED APPLICATION

This application is a divisional of U.S. patent application Ser. No. 15/241,927, filed Aug. 19, 2016, entitled "Evolving Rule Based Contact Exchange." which application is a continuation of U.S. patent application Ser. No. 14/244,850 filed Apr. 3, 2014, entitled "Evolving Rule Based Contact Exchange," which applications are incorporated herein by reference in their entirety.

BACKGROUND

Once a person (person A) has passed their contact information (e.g. a telephone number or email address) to another person (person B), the recipient (person B) can continue to use that information if and when they wish and the person to whom the contact details relate (person A) has little or no control over any subsequent use of the details by the recipient (person B). Particularly in situations where the two people do not know each other well and where there is inherent uncertainty about future relations (e.g. newly established romantic liaisons, when selling or buying items online, etc.), a person may not want to share their contact information in perpetuity.

Existing solutions involve creation of a new "spam" email address to hide a person's main email address or purchasing a "burner" SIM card or mobile telephone. Whilst these solutions protect a person's main contact details, they have the disadvantage of suggesting a furtive manner in the relationship; they also add inconvenience because of the necessity to use a separate email account or mobile phone.

The embodiments described below are not limited to implementations which solve any or all of the disadvantages of known methods of managing contact information.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods and systems are described for managing a user's contact data which use evolving sequential sets of rules where the applicability of each set depends upon adherence or proper application of a prior set. In an embodiment, an initial set of restrictions are generated based on input from a first user, the restrictions relating to contact made by a second user to the first user. These initial restrictions are subsequently modified in response to the second user contacting the first user based on the contact made and a characteristic of the contact. The methods may apply to any form of contact between the first and second users and in an embodiment applies to contact made by the second user to a cellular telephone number belonging to the first user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, there may be situations where a person (person A) is concerned to control the implied rights of contact articulated in the sharing of contact information and wishes therefore to exert control of those rights. A person may not want to share their contact information in perpetuity; rights to that contact information may be better treated as sanctioned, with time limitations representing constraints on what is viewed as due propriety.

A system is described below by which the person sharing the contact details maintains control over their contact details by granting access rights to another person. These access rights are not static but instead are automatically modified in response to the recipient (person B) using the contact details for the first time (e.g. such that they are automatically changed over time). In various examples, the owner of the contact details (person A) may also update the access rights at any time. The system and methods described below may be used for sharing telephone numbers (e.g. mobile telephone numbers), email addresses, Voice over IP (VoIP) usernames, instant messenger identifiers (IM IDs), social networking contact details, postal addresses or other geographic locations, etc.

Figure 1:
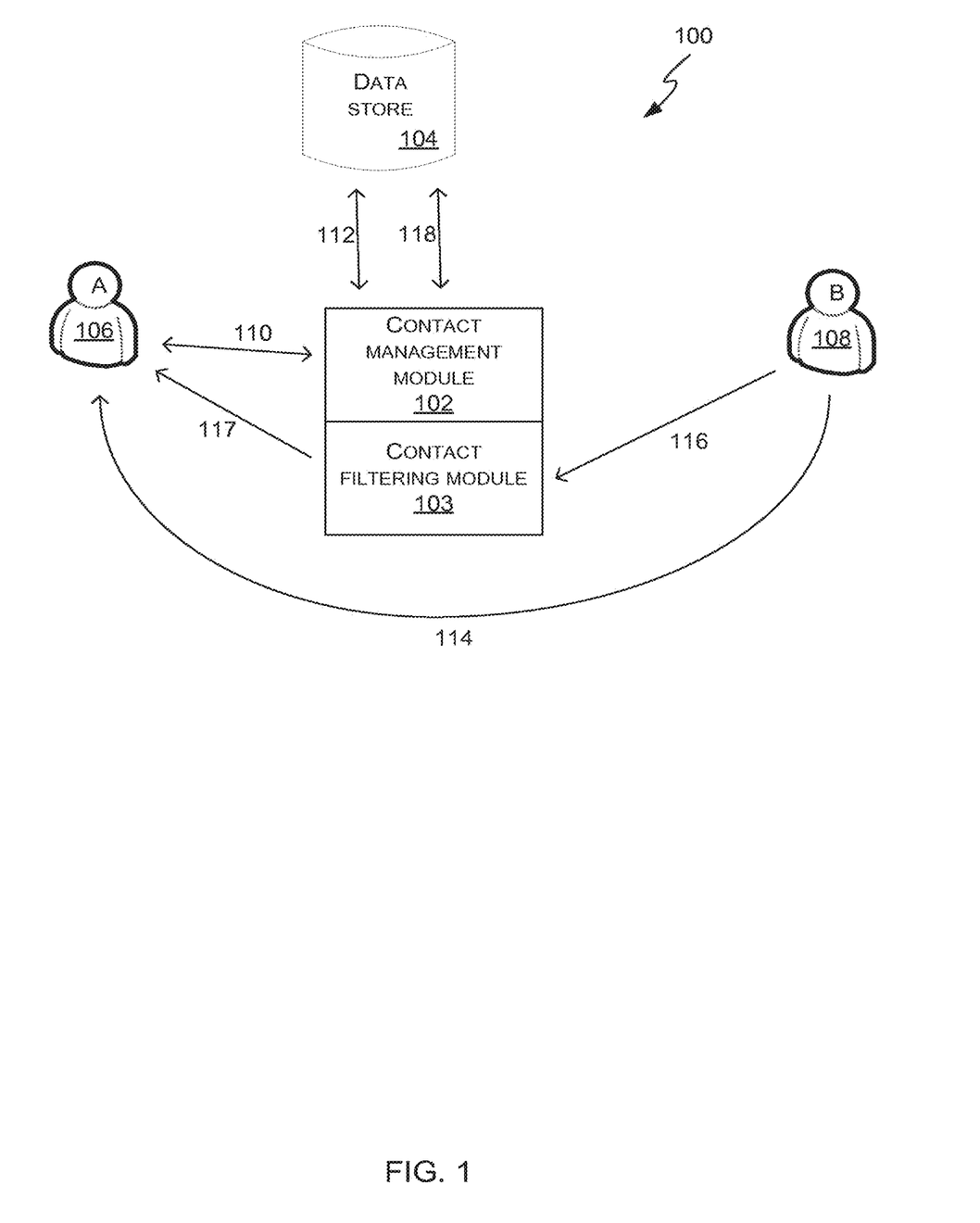
FIG. 1 is a schematic diagram of a system comprising a contact management module, a contact filtering module and a data store which is arranged to store access right data.

FIG. 1 is a schematic diagram of a system 100 comprising a contact management module 102, a contact filtering module 103 and a data store 104 which is arranged to store access right data. Although the contact management module 102 and contact filtering module 103 are shown as separate functionality entities, in some examples, they may be combined into a single module which performs both functions. The operation of the system 100 can be described with reference to FIG. 2 which shows two example methods 201, 202 of operation of the system 100 shown in FIG. 1 and FIG. 3 which shows how the access rights are used.

Figure 2:
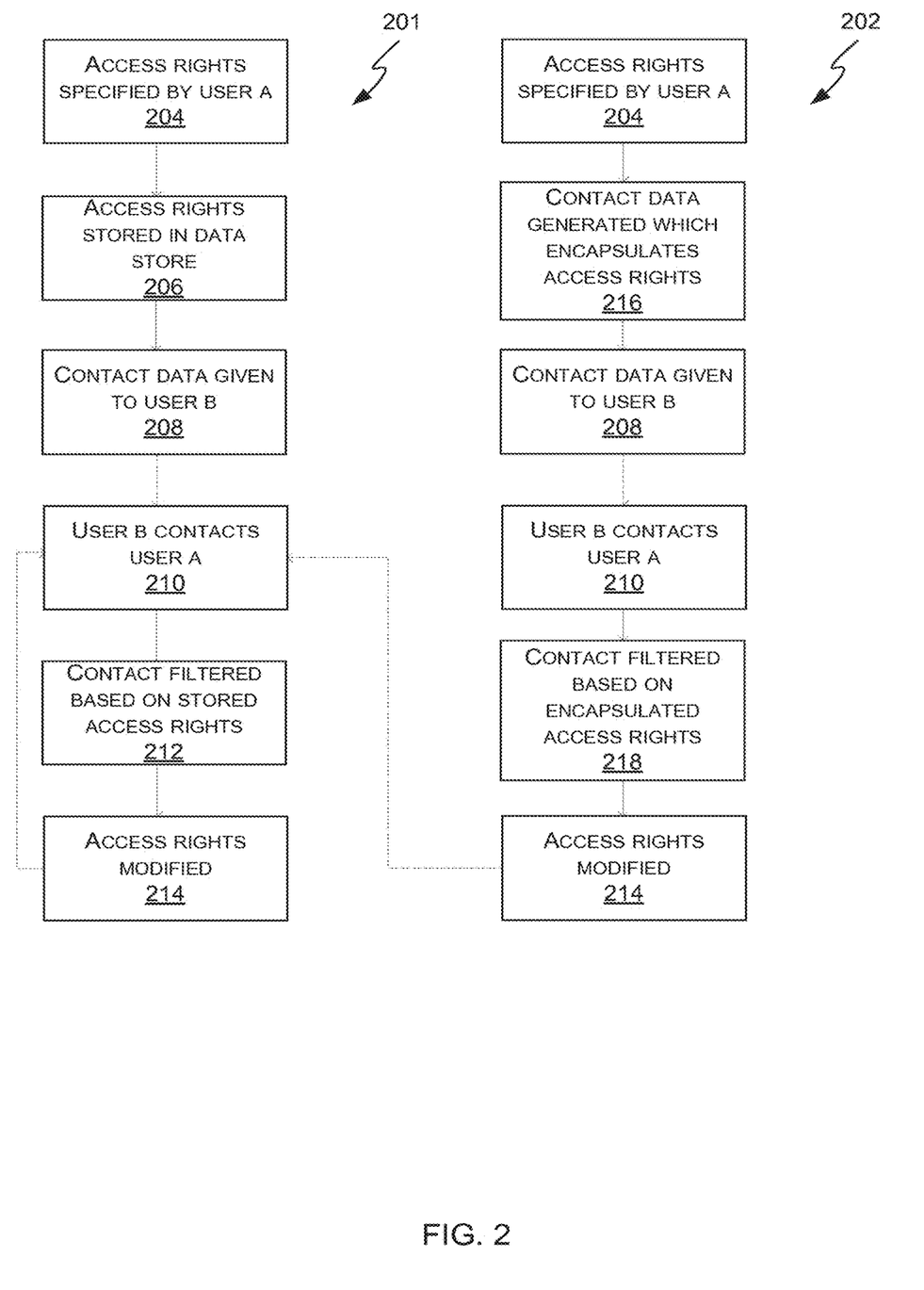
FIG. 2 shows two example methods of operation of the system shown in FIG. 1.

In the first example method 201, when a first person, user A 106 wants to share their contact information (e.g. a telephone number, email address, IM IDs, etc.) with a second person, user B 108, user A specifies access right data associated with their contact data (block 204), e.g. via an interface provided by the contact management module 102 (arrow 110) and the access right data is stored in the data store 104 (block 206, arrow 112). This access right data which is generated by the contact management module 102 in response to user input (in block 204) and stored (in block 206) may be referred to as initial access right data and this may describe restrictions on when user B can contact user A (e.g. only between 9 am and 5 pm on a week day) and/or how user B can contact user A (e.g. from a specific telephone number) and also may comprise a positive requirement in relation to the contact (e.g. user B must contact user B before 9 pm on Thursday). Further details about the initial access right data, which may be specified in terms of a series of rules, are described below.

Having established the access rights, user A provides contact data to user B (block 208, arrow 114). The contact data may be the actual, long-term contact details for user A (e.g. their actual email address or mobile telephone number) or may be temporary contact details (e.g. which may have been generated by the contact management module 102 specifically to be given to user B or to a group of users). The access rights which are stored in the data store 104 (in block 206) are linked to the contact details provided to user B. Where contact details provided to user B are not specific to user B, the linking of the stored access rights to the contact details provided may be achieved by associating the access rights with details of user B (e.g. contact details for user B), e.g. {user B details, access rights for user B}. Where the contact details provided to user B are specific to user B, the linking of the stored access rights to the contact details provided may be achieved by associating the access rights with the details provided, e.g. {user B specific contact details, access rights for user B}.

Figure 3:
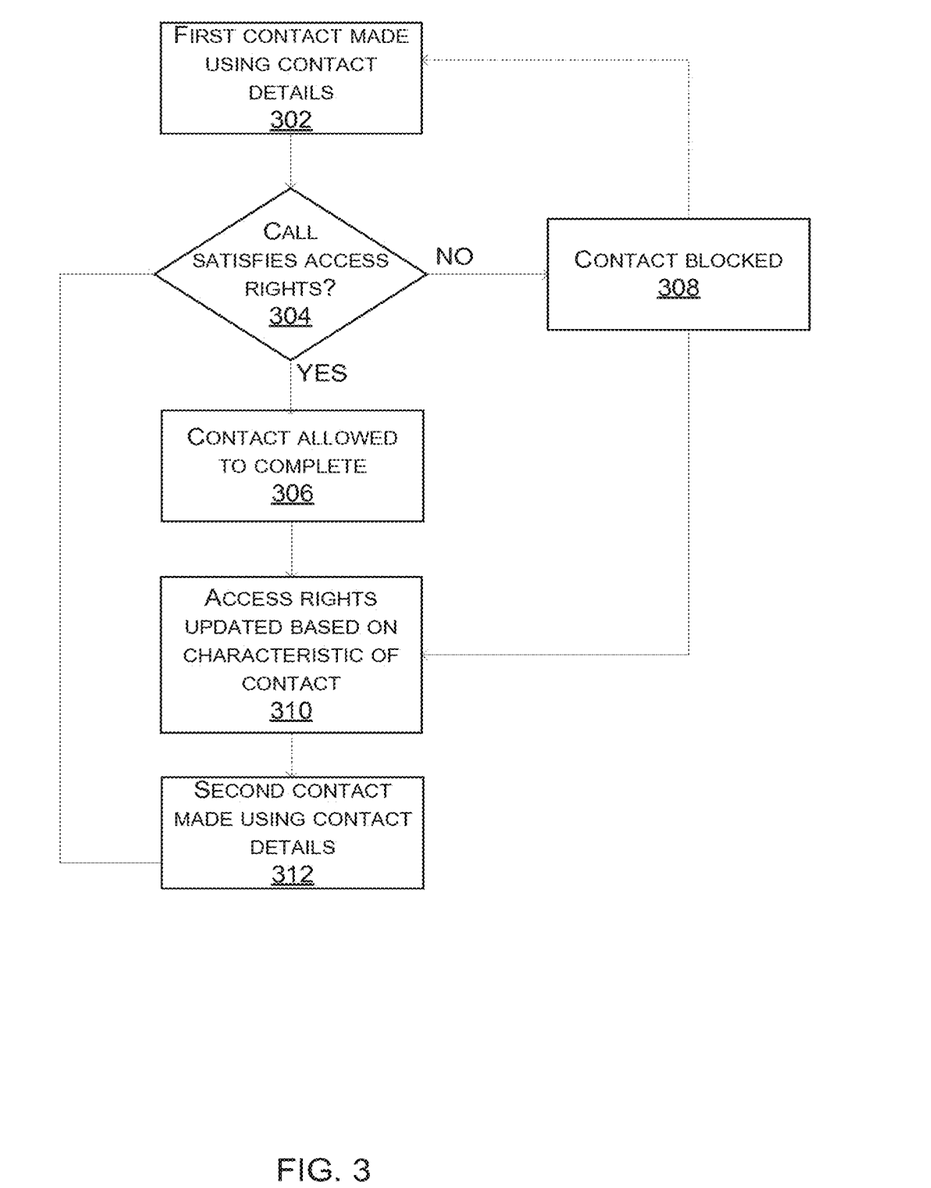
FIG. 3 is a flow diagram showing an example of how access rights generated in the system of FIG. 1 are used.

If user B then uses the contact data to contact user A (blocks 210 and 402), the contact is filtered by the contact filtering module 103 (blocks 212 and 304, arrow 116) and the contact is only allowed to complete (block 306, arrow 117) if the access rights are satisfied ('Yes' in block 304). If the access rights are not satisfied ('No' in block 304), the call is not allowed to complete and is blocked (block 308). For example, if the access rights (stored in block 206) specify that user B can only call user A from a specific telephone number and within a defined time window (e.g. between 9 am and 5 pm), the contact from user B will only be allowed to complete to connect to user A if the call is from the correct telephone number and at the correct time of day. In another example, if the access rights (stored in block 206) specify that user B must call user A before 5 pm on Thursday, the contact from user B will only be allowed to complete to connect to user A if the call is made prior to 5 pm on Thursday and otherwise the call will not complete.

Where the call is blocked (in block 308), user B may only know that the call has failed (e.g. user B may hear a standard tone indicating that a telephone number is unavailable) or in other examples they may receive a message such as an audio message played by the contact filtering module 103. In various examples, user A may be able to configure what user B experiences in the event that a call is blocked.

In response to user B using the contact details provided (in block 208) to contact user A for the first time (in blocks 210 and 302, arrow 116), the contact management module 102 modifies the stored initial access rights to create modified access rights (blocks 212 and 310, arrow 118). The modifications which are made to the access rights (in blocks 212 and 310) are based on the fact that the contact details were used and a characteristic of the resulting interaction between the two users (e.g. which may be monitored by the contact filtering module 103 and communicated to the contact management module 102). In various examples, the modifications may be made irrespective of whether the contact was allowed to complete or not (in block 212), although this may affect the resulting modification. In other examples, the modifications may only be made if the call was allowed to complete (in block 212).

The initial access rights may be modified in any way based on the fact the contact was made and a characteristic of the interaction between user A and user B (in blocks 212 and 310). In various examples, the access rights may be relaxed, e.g. such that user B can contact A over a wider range of times or at any time, or the access rights may be restricted (e.g. such that in an extreme case, user B cannot contact user A ever again using the contact details provided).

Once the access rights have been modified (in blocks 212 and 310), subsequent use of the contact details (provided in block 208) by user B to contact user A (block 312) are governed by the modified access rights and not the initial access rights (i.e. the modified access rights are used in block 304). In some examples, the access rights may be further modified based on characteristics of subsequent interactions (as indicated by the dotted arrow from block 212 to block 210 in FIG. 2).

In the second example method 202, when a first person, user A 106 wants to share contact information with a second person, user B 108, user A specifies access right data associated with the contact data (block 204), e.g. via an interface provided by the contact management module 102 (arrow 110). This access right data which is generated by the contact management module 102 in response to user input (in block 204) may be referred to as initial access right data. The access right data may be stored in the data store (e.g. as in block 206) although in other examples this is omitted at this stage.

Contact data is then generated (e.g. by the contact management module 102) which encapsulates the initial access right data (block 216). There are many ways in which the contact data may be encapsulated and in various examples, the contact details may also be encrypted or obfuscated such that user B cannot determine the restrictions from the contact details provided. For example a telephone number may have the form XXXXXXXpYYYYYYY where "XXXXXXX" is user A's actual telephone number or is a contact number for an entity which provides the contact filtering module 103, "p" means pause (so that the contact filtering module 103 has time to pick up) and "YYYYYYY" is a DTMF sequence which encodes the restrictions e.g. hashed so that they are not readable by person B and cryptographically signed so that the contact filtering module 103 can be sure that they were generated by user A (e.g. using A's public key or a shared secret between user A and the server). In a variation on this, where "XXXXXXX" does not comprise actual contact details for A, but a temporary number or a number for the contact filtering module 103, "YYYYYYY" comprises some actual contact details for A and the restrictions, all signed by user A's public key (which may be denoted {contact details for user A, restriction(s)}$_{Apub}$). In another example, instead of comprising the actual restrictions "YYYYYYY" comprises an identifier for a set of restrictions which are stored in the data store 104 and this may have the effect of hiding the restriction information from user B without the need to use encryption/ obfuscation.

Having established the contact data (in block 216), user A provides contact data to user B (block 208, arrow 114). If user B then uses the contact data to contact user A (blocks 210 and 302), the contact is filtered by the contact filtering module based on the encapsulated access rights (blocks 218 and 304, arrow 116) and the contact is only allowed to complete (arrow 117) if the access rights are satisfied ('Yes' in block 304). For example, if the access rights encapsulated within the contact data specify that user B can only call user A from a specific telephone number and within a defined time window (e.g. between 9 am and 5 pm), the contact from user B will only be allowed to complete to connect to user A if the call is from the correct telephone number and at the correct time of day.

In response to user B using the contact details provided (in block 208) to contact user A for the first time (in blocks 210 and 302, arrow 116), the contact management module 102 modifies the encapsulated access rights to create modified access rights (blocks 214 and 310). The modification of the access rights may be as described above with reference to the first example, and may occur only if the call was allowed to complete (block 306) or also in cases where the call was blocked (block 308).

Following modification of the access rights (in block 214), the second method 202 proceeds as the first method 201 (as indicated by the dotted arrow from block 220 to block 210 in the first method 201). Subsequent use of the contact details (provided in block 208) by user B to contact user A (block 312) are governed by the modified access rights and not the initial access rights which are encapsulated in the contact data (i.e. the modified access rights are used in block 304).

In various examples (of either method shown in FIG. 2), the modified access rights (generated in block 214) may be stored in the data store (arrow 118). In other examples, however, there is no explicit log of modified access rights but instead when the contact details are subsequently used (in block 312), a call or activity log is checked (where the call log may record all the calls made by user B or received by user A or only contacts between users A and B) and the current (and hence modified) access rights are derived from the initial access rights (which may be stored in the data store in the first method of FIG. 2 and encapsulated in the contact details in the second method of FIG. 2) and the call log. In an example, if the initial access rights indicated that user B must call user A to retain the right to call user A, when a subsequent call is received from user B, the call log may be checked to determine whether this requirement has been satisfied by user B.

In examples where there is no explicit log (or store) of modified access rights, it will be appreciated that the modified access right data may be generated (in block 214) dynamically when a subsequent call is made by user B to user A based on the initial access right data and the call/activity log.

In some examples (of either method shown in FIG. 2), the stored modified access rights may be further modified based on characteristics of subsequent interactions (as indicated by the dotted arrow from block 212 to block 210 in FIG. 2). In various examples, the modified access rights may be modified based on each contact (e.g. each contact attempt or each successful contact) made by user B to user A or alternatively, the modified access rights may be updated periodically. For example, the modified access rights may be updated after every 5 contacts or where the time interval between contacts exceeds a threshold (e.g. if user B has not contacted user A for a week). In various examples, the system may reset the access rights to the initial values, or to another value, if user B does not contact user B for a defined period of time (e.g.

a week). User A may also trigger the resetting of the access rights to the initial value or another value (which may, for example, either prevent all contacts or remove all contact restrictions).

As described above, the initial access right data specifies one or more restrictions on when user B can contact user A and/or how user B can contact user A. The restrictions may therefore define a time period when contact is permitted and/or a time period when contact is not permitted. In addition, or instead, the restrictions may define a way in which user B can contact user A (e.g. from a specific telephone number) and where the contact details may be used in different ways (e.g. a mobile telephone number may be used to initiate a voice call, SMS message, MMS message, etc. the restrictions may define what method of contact is permitted or prohibited (e.g. contact is permitted by voice call but not by SMS or MMS, etc.). As described above, the restrictions may comprise a positive requirement in relation to the contact, for example, user B must contact user B before 9 pm on Thursday. If this positive requirement is not met, the contact details will not work again (e.g. all contact attempts will be blocked in block 304 as the access rights will not be satisfied); however if the requirement is met by a first contact, the access rights may be modified to allow further calls. These restrictions may be defined in one or more rules which can be checked (e.g. in block 304) and it will be appreciated that the access rights may combine any aspect of the restrictions described above and may comprise a single rule or may comprise many rules which encompass multiple aspects (e.g. when, how, etc.).

As described above, the initial access rights may be modified in any way (in blocks 212 and 310) based on the fact the contact was made and a characteristic of the interaction between user A and user B. In various examples, the access rights may be relaxed or the access rights may be restricted. Examples of characteristics of the resulting interaction which may be used include, but are not limited to: whether user A answered or rejected the contact attempt for voice calls (e.g. cellular or VoIP), whether user A replied (e.g. for message based interactions such as email, SMS, MMS and IM), the length of the interaction (e.g. the length of a voice call or IM interaction), a time interval since the contact data was shared, a time interval between contact attempts (e.g. such that a first contact attempt by user B is always blocked, but a subsequent attempt within 30 minutes of the failed attempt will succeed), the content of the interaction (e.g. actual words said in a voice call or written in an email or IM session), etc. For example, if user B uses an offensive word during a contact, the access rights may be restricted, e.g. such that they cannot call user A at all or cannot call user A for a period of time (e.g. 24 hours). In various examples, the characteristics may be characteristics of the contact act (e.g. length of contact, when the contact occurred, which contact method was used, which device or device type was used by user B to make the contact, spatial aspects such as where one or both users were when the contact was made, etc.) and/or characteristics of the content of the contact (e.g. words used, speech volume or other characteristic of the speech, etc.). Where speech processing is used to analyze a voice call, characteristics such as turn-taking, gaps in the conversation, tone of voice (e.g. to identify emotions), etc. may be identified and used to determine how the access rights should be modified.

In various examples other parameters may also be used when modifying the access rights (in block 212) such as characteristics of return contacts made by user A to user B (e.g. such that user B can only call user A if the previous contact between the two users was user A calling user B), characteristics of contact between user B and a third party (e.g. user C), characteristics of contacts between two third parties (e.g. between user C and user D) or characteristics of other contacts between users A and B outside the system (e.g. the access rights for user B may be restricted if user B does not communicate regularly with user A on a social network).

Various example usage scenarios are described herein. In further examples, the initial access rights or the modified access rights may only all calls on certain days of the week, times of the day, days of the year, days of significance (e.g. birthdays, anniversaries, Christmas Day, etc.). In various examples, the modified access rights may restrict rights (permanently or temporarily) based on a past history of behavior of one or both of the parties. For example, if user B calls user A at an unsociable time of day (e.g. in the middle of the night), the methods described herein may automatically block or otherwise restrict such calls in the future (e.g. the modified access rights may include a block on calls received between midnight and 7 am).

As described above, in response to a first contact, the initial access rights are modified to create modified or updated access rights and these modified or updated access rights are applied to subsequent contact from user B. The access rights may be modified in any way in response to the contact being made and any characteristic of the contact. The modification of the access rights may comprise relaxing the rights or restricting the rights. In other examples, the modification of the access rights may enable a user to use a different contact method for a subsequent contact (e.g. if user A emails user B, user B may then be permitted to make a voice call to user B or if user B communicates with user A publicly within a social network, then user B may be able to make a private contact attempt to user A).

In various examples, where the first contact is successful (i.e. it is allowed to complete in block 306), the access rights may be relaxed and in an extreme case they may be modified such that there are no restrictions on the use of the contact data by user B. In various examples, where the first contact is not successful (i.e. the call is blocked in block 308), the access rights may be restricted (and in an extreme case this may prevent user B from successfully using the contact data to contact user A in the future); however, in other examples, the access rights may not be affected unless the first contact is at least allowed to complete (e.g. the arrow from block 308 to block 310 in FIG. 3 may be omitted). In various examples, where the first contact is blocked and the access rights not modified, a subsequent contact using the contact details may be treated as if it is the first contact (as indicated by the dotted arrow from block 308 to block 302 in FIG. 3).

Where the access rights are defined as a set of restrictions (where the set may comprise one or more restrictions), with each restriction expressed as a rule, the access rights may be considered to be an evolving rule set. As described above, the filtering changes over time as a result of the rule set evolving.

Although FIGS. 2 and 3 show the access rights being modified based on the first contact made by user B and then in some examples, the access rights being further modified based on a second or subsequent contact made by user B, in various examples, the modification to an access right may be based on a characteristic of the most recent contact and also based on a characteristic of one or more previous contacts or based on a sequence of contacts, such that the access rights are modified based on a pattern of contacts made by user B. For example, access rights may be relaxed if user B successfully calls user A three or more times during a defined time period and may be restricted further if user B does not successfully call user A three or more times during the period.

Figure 4:
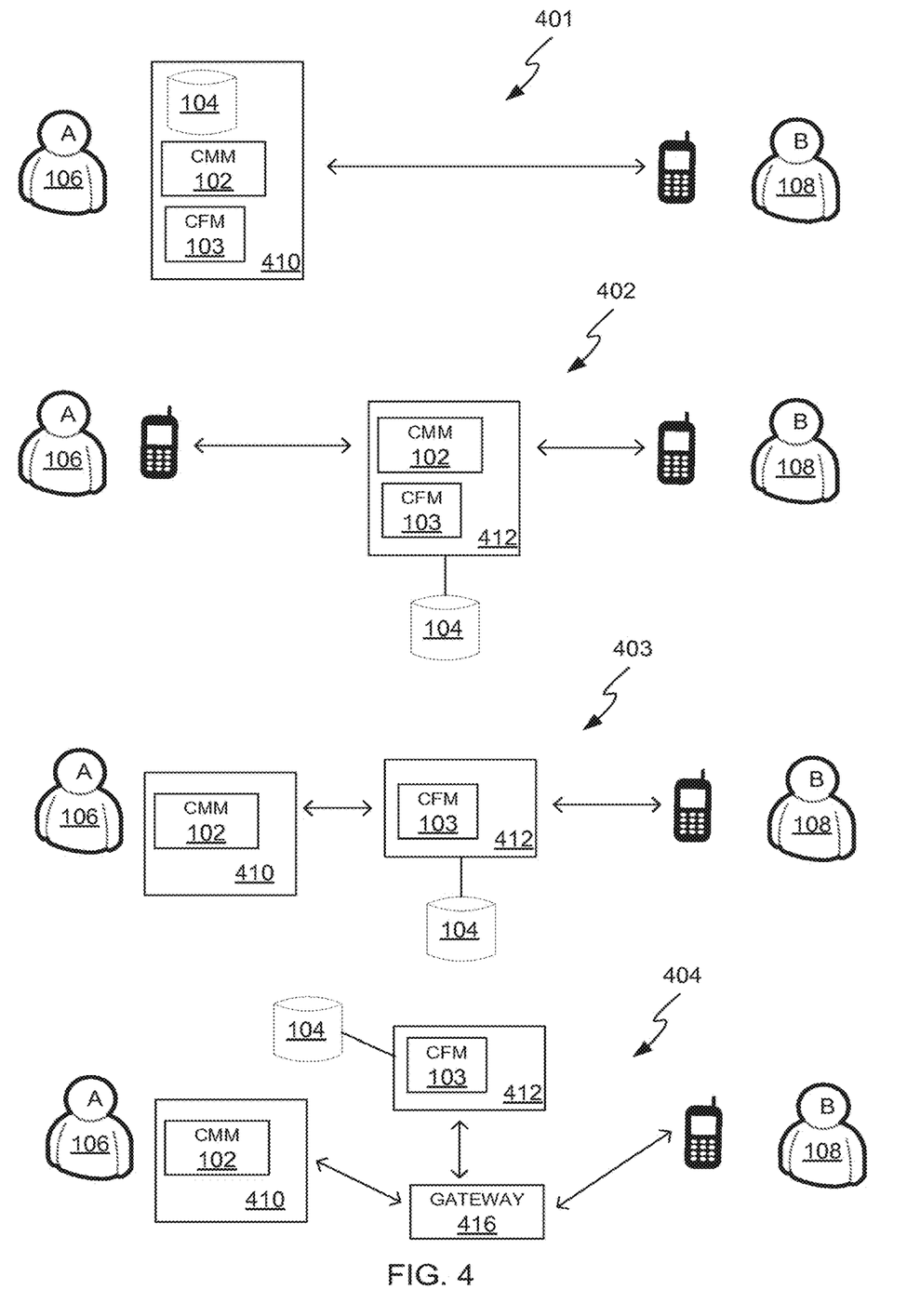
FIG. 4 shows four different example implementations of the system shown in FIG. 1.

The contact management module (CMM) 102 shown in FIG. 1 may be implemented on a server within a communications system or on a user device (e.g. mobile telephone, tablet computer, laptop computer, games console, etc.). Similarly, the contact filtering module (CFM) 103 shown in FIG. 1 may be implemented on a server within a communications system or on a user device (e.g. mobile telephone, tablet computer, laptop computer, games console, etc.). FIG. 4 shows four different example implementations 401-404.

In the first example 401, both the CMM 102 and the CFM 103 are implemented on a user device 410, for example, within an application running on the user device 410. In such an example, user A interacts with the application to establish the initial access rights and, where required, to generate contact details to give to user B. In this example, the data store 104 is also shown as being on the user device 410, which enables the user to establish the access rights and contact details even when not connected to the network (e.g. when offline). In other examples, the data store 104 may be within the network even where both the CMM and CFM are on the user device 410.

In the second example 402, both the CMM 102 and CFM 103 are on a server 412 within the network. In this example, user A communicates with the CMM via a user device 414 (e.g. which may be any kind of computing-based device, including a smart phone, tablet, laptop, games console, etc.) and may use a browser on the user device 414 or another application running on the device. By performing the computational effort within the network, rather than the user device, this means that resources on the user device are not used in implementing the system. Also, as the CFM 103 is located in the network, the contact filtering may be implemented irrespective of whether the user device 414 is switched on or off.

In the third and fourth examples 403, 404, the CFM 103 is located within the network and the CMM 102 is located on a user device, such that these may be considered variants on a combination of the first two examples 401-402. As the CMM 102 is located on user device, the establishment of access rights may be performed when the device is offline. Where the access rights are not encapsulated within the contact data (as in the first method in FIG. 2), the access rights must be stored in the network (such that they are accessible by the CFM 103) prior to user B making contact. Where the access rights are encapsulated within the contact data, the CFM does not need to receive the access rights in advance of the first contact and so the CMM can operate offline. As the CFM 103 is located in the network, the contact filtering may be implemented irrespective of whether the user device 414 is switched on or off.

In a variation on the third example 403, the CMM 102 may communicate with a server (e.g. server 412) to generate temporary contact details such that a part of the functionality of the CMM 102 (e.g. the establishment and updating of access rights) is implemented on the user device (e.g. in an application running on a smartphone) and part of the functionality of the CMM 102 (e.g. the generating of contact data) is implemented on a server within the network.

In the fourth example 404, there is an additional entity, a gateway 416, which may for example be a telephony gateway, and this example may be particularly suited to situations where temporary contact details are used. The gateway intercepts the call (or contact attempt), identifies that the contact details being used by user B to contact user A are temporary contact details and in response, alerts the CFM 103 which determines whether the access rights are satisfied by the particular contact. The gateway 416 is notified by the CFM of the outcome of the check of the access rights and in response the gateway completes the call (e.g. to the actual contact details, e.g. as provided by the CFM to the gateway along with a positive outcome) or rejects the call.

Figure 5:
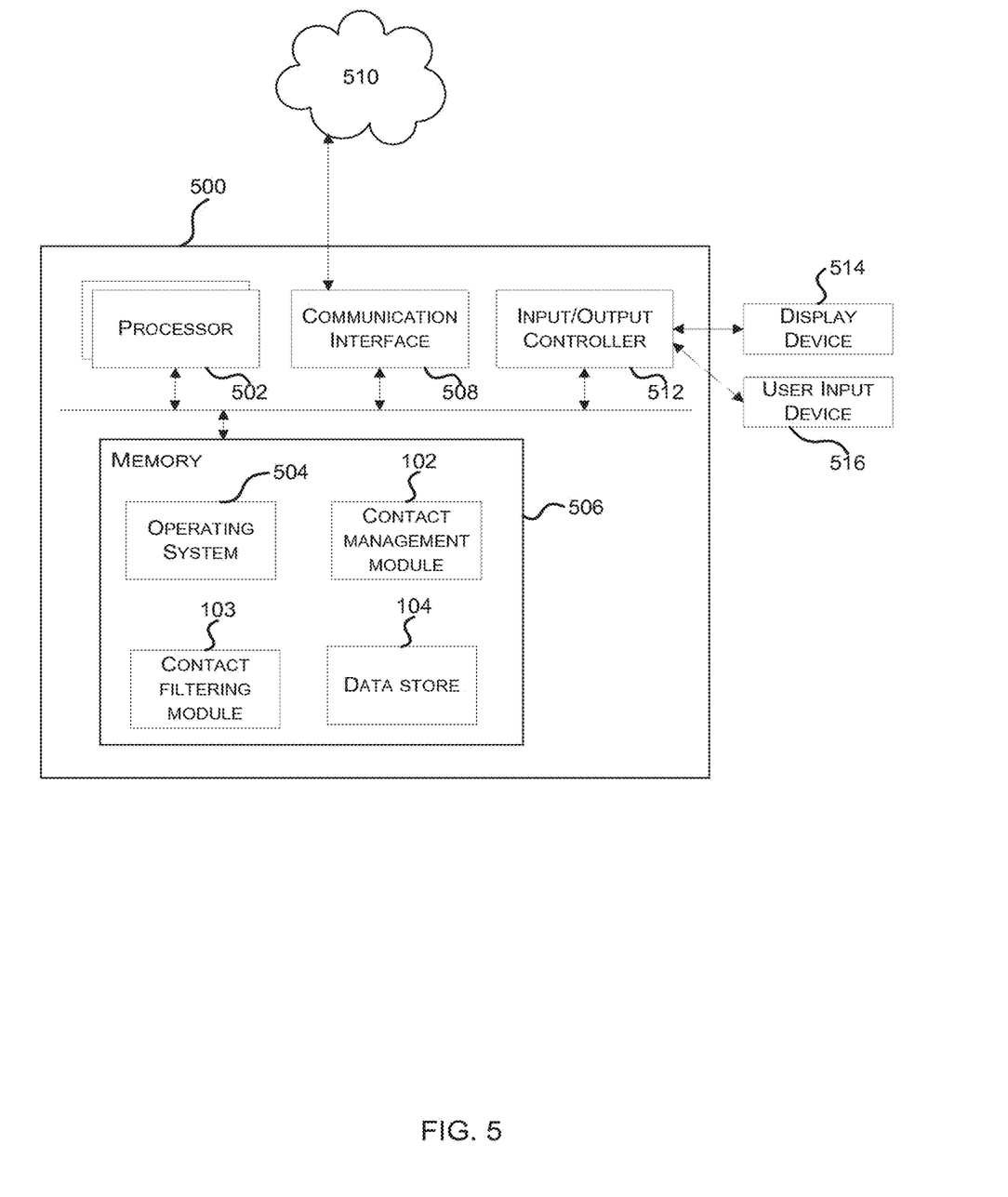
FIG. 5 illustrates an exemplary computing-based device in which embodiments of the methods described herein may be implemented.

FIG. 5 illustrates various components of an exemplary computing-based device 500 which may be implemented as any form of a computing and/or electronic device, and in which embodiments of the methods described may be implemented. For example, the computing-based device 500 may act as a user device 410 or a server 412 as shown in the examples in FIG. 4 and described above.

Computing-based device 500 comprises one or more processors 502 which may be microprocessors, controllers or any other suitable type of processors for processing computer executable instructions to control the operation of the device in order to perform the functionality of the CMM 102 and/or CFM 104 or part of the CMM or CFM. In some examples, for example where a system on a chip architecture is used, the processors 502 may include one or more fixed function blocks (also referred to as accelerators) which implement a part of the method of contact management and/or contact filtering in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 504 or any other suitable platform software may be provided at the computing-based device to enable application software, such as the CMM 102 and/or CFM 103 (or part of the CMM and/or CFM) to be executed on the device.

The computer executable instructions may be provided using any computer-readable media that is accessible by computing based device 500. Computer-readable media may include, for example, computer storage media such as memory 506 and communications media. Computer storage media, such as memory 506, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 506) is shown within the computing-based device 500 it will be appreciated that the storage may be distributed or located remotely and accessed via a network or other communication link (e.g. using communication interface 508).

The communication interface 508 connects the computing-based device 500 to a network 510. This may, for example, be a cellular network, a VoIP network, the internet or an intranet or any other network. The communication interface 508 may use wired or wireless technology.

The computing-based device 500 also comprises an input/output controller 512 which may be arranged to output display information to a display device 514 which may be separate from or integral to the computing-based device 500. The display information may provide a graphical user interface. The input/output controller 512 may also be arranged to receive and process input from one or more devices, such as a user input device 516 (e.g. a mouse, keyboard, camera, microphone or other sensor). In some examples the user input device 516 may detect voice input, user gestures or other user actions and may provide a natural user interface (NUI). This user input may be used to establish access rights and/or share contact data with another user. In an embodiment the display device 514 may also act as the user input device 516 if it is a touch sensitive display device. The input/output controller 512 may also output data to devices other than the display device, e.g. a locally connected printing device (not shown in FIG. 5).

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a systems as shown in FIG. 4, the system described is provided as an example and not a limitation. As those skilled in the art will appreciate, the present examples are suitable for application in a variety of different types of communications systems and for any contact means (e.g. voice call, IM, SMS, MMS, email, social networking, etc.).

In a particular example, the methods described above may be used by a user when sharing a mobile telephone number (which may also be referred to as a cellular telephone number). Unlike telephone numbers for fixed lines, there is typically no directory to enable user B to find user A's mobile telephone number. Although there may be no directory for email addresses either, user B may be able to search for user A's email address using an internet search engine and/or user B may be able to deduce (or guess) user A's email address based on knowledge of user A (e.g. based on user A's name and where user A works). This means that user A may be particularly concerned about sharing their mobile telephone number with a user with whom they do not have an established trust relationship. In various examples, the methods described above may be limited to contact data comprising a mobile/cellular telephone number and to contacts made using that number (e.g. voice calls, SMS, MMS, etc.).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:
receiving, from an electronic device of a first user of a communication system, initial access right data corresponding to contact information of the first user, the initial access right data including at least one condition associated with a second user connecting with the first user via the communication system;
receiving a first contact request from an electronic device of the second user and via the communication system, the first contact request associated with the contact information;
determining that the first contact request satisfies the at least one condition associated with the second user of the initial access right data;
initiating a first connection between the electronic device of the first user and the electronic device of the second user via the communication system;
generating modified access right data associated with a subsequent use of the contact information by the second user of the communication system, based in part on a characteristic of the first connection between the electronic device of the first user and the electronic device of the second user.

2. The method according to claim 1, further comprising receiving the contact information from the electronic device of the first user of the communication system, the contact information enabling the second user to connect with the first user via the communication system.

3. The method according to claim 1, further comprising generating the contact information including temporary contact details.

4. The method according to claim 3, further comprising:
storing the initial access right data in a data store; and
determining the contact information comprising an identifier of the initial access right data stored in the data store.

5. The method according to claim 1, further comprising:
determining that the first contact request satisfies the initial access right data; and
in response to determining that the first contact request satisfies the initial access right data, generating the modified access right data.

6. The method according to claim 1, further comprising determining the modified access right data based at least in part on characteristics of connections between the second user and a third user of the communication system.

7. The method according to claim 1, further comprising determining the modified access right data defining restrictions on times or dates during which the subsequent use of the contact information is permitted.

8. The method according to claim 1, further comprising blocking the electronic device of the second user from connecting with the electronic device of the first user via the communication system based at least in part on the initial access right data.

9. The method according to claim 1, wherein the subsequent use comprises a private connection and the communication system comprises a social network.

10. The method according to claim 1, further comprising receiving the first contact from a browser on the electronic device of the second user.

11. At least one non-transitory computer readable medium including instructions for controlling use of contact data that when executed by at least one processor, cause the at least one processor to:
receive, from an electronic device of a first user of a communication system, initial access right data corresponding to contact information of the first user, the initial access right data including at least one condition associated with a second user connecting with the first user via the communication system;
receive a first contact request from an electronic device of the second user and via the communication system, the first contact request associated with the contact information;
determine that the first contact request satisfies the at least one condition associated with the second user of the initial access right data;
initiate a first connection between the electronic device of the first user and the electronic device of the second user via the communication system;
generate modified access right data associated with a subsequent use of the contact information by the second user of the communication system, based in part on a characteristic of the first connection between the electronic device of the first user and the electronic device of the second user.

12. The at least one computer readable medium of claim 11, further comprising instructions to receive the contact information from the electronic device of the first user of the communication system, the contact information enabling the second user to connect with the first user via the communication system.

13. The at least one computer readable medium of claim 11, further comprising instructions to:
determine that the first contact request satisfies the initial access right data; and
in response to determining that the first contact request satisfies the initial access right data, generate the modified access right data.

14. The at least one computer readable medium of claim 11, further comprising instructions to determine the modified access right data defining restrictions on times or dates during which the subsequent use of the contact information is permitted.

15. The at least one computer readable medium of claim 11, further comprising instructions to block the electronic device of the second user from connecting with the electronic device of the first user via the communication system based at least in part on the initial access right data.

16. A system for controlling use of contact data, comprising:
at least one processor; and
memory including instructions that, when executed by the at least one processor, cause the at least one processor to:
receive, from an electronic device of a first user of a communication system, initial access right data corresponding to contact information of the first user, the initial access right data including at least one condition associated with a second user connecting with the first user via the communication system;
receive a first contact request from an electronic device of the second user and via the communication system, the first contact request associated with the contact information;
determine that the first contact request satisfies the at least one condition associated with the second user of the initial access right data;
initiate a first connection between the electronic device of the first user and the electronic device of the second user via the communication system;
generate modified access right data associated with a subsequent use of the contact information by the second user of the communication system, based in part on a characteristic of the first connection between the electronic device of the first user and the electronic device of the second user.

17. The system of claim 16, further comprising instructions to receive the contact information from the electronic device of the first user of the communication system, the contact information enabling the second user to connect with the first user via the communication system.

18. The system of claim 16, further comprising instructions to:
determine that the first contact request satisfies the initial access right data; and
in response to determining that the first contact request satisfies the initial access right data, generate the modified access right data.

19. The system of claim 16, further comprising instructions to determine the modified access right data defining restrictions on times or dates during which the subsequent use of the contact information is permitted.

20. The system of claim 16, further comprising instructions to block the electronic device of the second user from connecting with the electronic device of the first user via the communication system based at least in part on the initial access right data.

* * * * *